(12) United States Patent
Tonari

(10) Patent No.: US 10,033,025 B2
(45) Date of Patent: Jul. 24, 2018

(54) ENERGY STORAGE DEVICE INCLUDING PROJECTING PORTION LOCATED BETWEEN BUS BAR AND FASTENING MEMBER, AND ENERGY STORAGE APPARATUS

(71) Applicant: GS Yuasa International Ltd., Kyoto-shi (JP)

(72) Inventor: Takuma Tonari, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 350 days.

(21) Appl. No.: 14/875,573

(22) Filed: Oct. 5, 2015

(65) Prior Publication Data

US 2016/0099455 A1 Apr. 7, 2016

(30) Foreign Application Priority Data

Oct. 6, 2014 (JP) ................. 2014-205800

(51) Int. Cl.
*H01M 2/26* (2006.01)
*H01M 2/20* (2006.01)
*H01M 2/30* (2006.01)
*H01M 10/0525* (2010.01)
(Continued)

(52) U.S. Cl.
CPC .......... *H01M 2/206* (2013.01); *H01M 2/263* (2013.01); *H01M 2/305* (2013.01); *H01M 10/0431* (2013.01); *H01M 10/0525* (2013.01); *H01M 10/0587* (2013.01); *H01M 2220/20* (2013.01); *Y02E 60/122* (2013.01)

(58) Field of Classification Search
CPC ...... H01M 2/206; H01M 2/263; H01M 2/305; H01M 10/0431; H01M 10/0525; H01M 10/0587; H01M 2220/20; Y02E 60/122
See application file for complete search history.

(56) References Cited

U.S. PATENT DOCUMENTS

| 2003/0104276 A1 | 6/2003 | Mizuno et al. |
| 2006/0141355 A1 | 6/2006 | Kang |
| 2012/0160558 A1 | 6/2012 | Okamoto et al. |

(Continued)

FOREIGN PATENT DOCUMENTS

| JP | S 58-060862 U | 4/1983 |
| JP | H 09-153351 A | 6/1997 |

(Continued)

*Primary Examiner* — Raymond Alejandro
(74) *Attorney, Agent, or Firm* — McGinn IP Law Group, PLLC.

(57) ABSTRACT

An energy storage apparatus includes energy storage devices each of which including an electrode assembly, a current collector connected to the electrode assembly, a terminal plate including a through hole, and a metal-made fastening member which fastens the terminal plate and the current collector to each other, and a bus bar physically connected to the terminal plate at a contacting surface of the bus bar and the terminal plate. The metal-made fastening member includes a body portion fixed to the current collector, a shaft portion extending from the body portion and passing through the through hole, and a swaged portion formed on the shaft portion outside the energy storage devices and fixing the terminal plate between the swaged portion and the body portion in a sandwiching manner.

18 Claims, 15 Drawing Sheets

(51) Int. Cl.
*H01M 10/04* (2006.01)
*H01M 10/0587* (2010.01)

(56) References Cited

U.S. PATENT DOCUMENTS

2014/0057135 A1    2/2014  Okamoto et al.
2014/0147729 A1*   5/2014  Moon .................. H01M 2/202
                                                       429/158

FOREIGN PATENT DOCUMENTS

| | | |
|---|---|---|
| JP | 2003-045403 A | 2/2003 |
| JP | 2003-045404 A | 2/2003 |
| JP | 2003-173767 A | 6/2003 |
| JP | 2006-156393 A | 6/2006 |
| JP | 2008-251213 A | 10/2008 |
| JP | 2012-028246 A | 2/2012 |
| JP | 2012-151098 A | 8/2012 |

* cited by examiner

FIG. 3
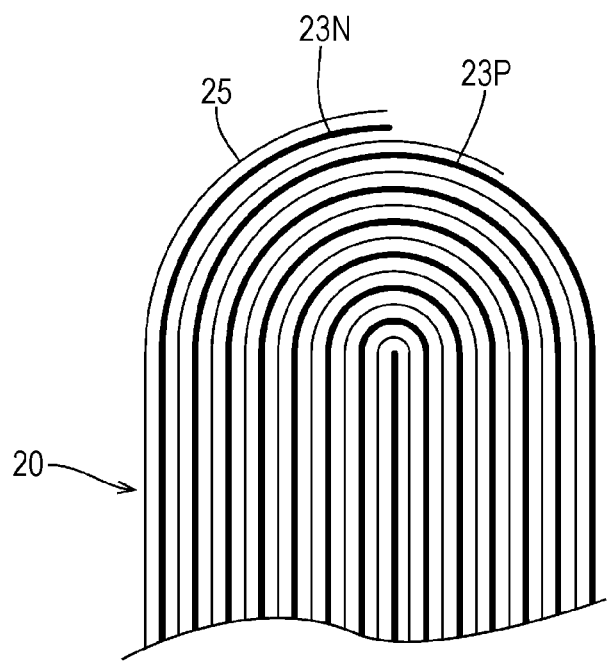
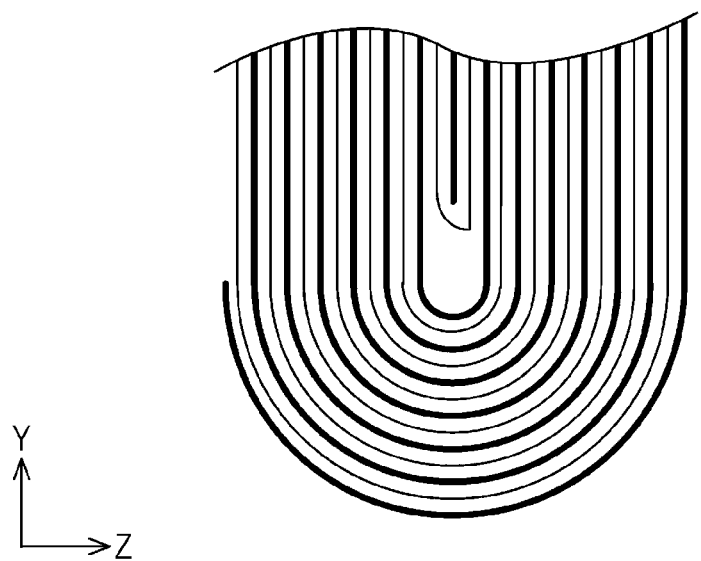

ENERGY STORAGE DEVICE INCLUDING PROJECTING PORTION LOCATED BETWEEN BUS BAR AND FASTENING MEMBER, AND ENERGY STORAGE APPARATUS

CROSS-REFERENCE TO RELATED APPLICATIONS

This application claims the benefit of Japanese patent application No. 2014-205800, filed on Oct. 6, 2014, which is incorporated by reference.

FIELD

The present invention relates to a technique for suppressing the increase in a contact resistance between a fastening member and a terminal plate.

BACKGROUND

An energy storage device such as a lithium ion secondary battery is configured such that, for example, as described in JP-2012-151098, a terminal plate (connection plate) is fastened to a current collector by means of a conductive fastening member (rivet), and the terminal plate is electrically connected to an electrode assembly through the fastening member and the current collector.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

It is preferable to set a contact resistance between the terminal plate and the fastening member small. However, for example, when vibrations are applied to the battery, a portion of the terminal plate is deformed so that a contact between the terminal plate and the fastening member becomes unstable thus giving rise to a possibility that the contact resistance is increased.

An object of the present invention to suppress the increase in a contact resistance between a terminal plate and a fastening member.

According to an aspect of the present invention, there is provided an energy storage device including: an electrode assembly; a current collector connected to the electrode assembly; a terminal plate to which a bus bar for connecting energy storage devices to each other is fixed; and a metal-made fastening member which fastens the terminal plate and the current collector to each other, wherein the fastening member includes: a body portion fixed to the current collector; a shaft portion extending from the body portion and passing through a through hole formed in the terminal plate; and a swaged portion formed on a distal end of the shaft portion, and fixing the terminal plate between the swaged portion and the body portion in a sandwiching manner, and one of the body portion and the terminal plate of the fastening member has a projecting portion which is brought into contact with the other of the body portion and the terminal plate, and the projecting portion is positioned between a fixed portion of the terminal plate fixed to the bus bar and the shaft portion of the fastening member.

BRIEF DESCRIPTION OF DRAWINGS

The foregoing and other features of the present invention will become apparent from the following description and drawings of an illustrative embodiment of the invention in which:

FIG. 3 is a cross-sectional view of an electrode assembly.

DESCRIPTION OF EMBODIMENTS

Figure 1:
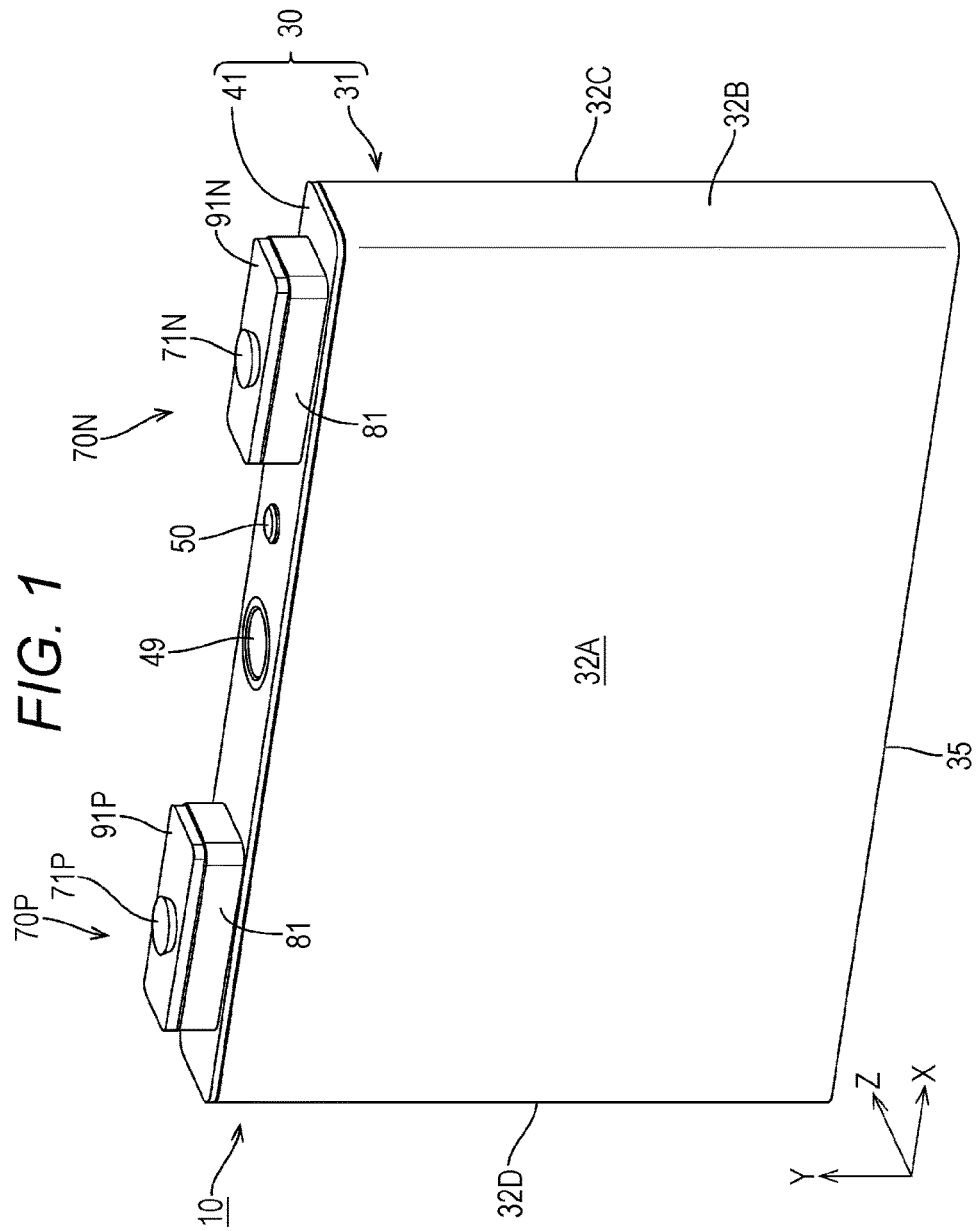
FIG. 1 is a perspective view of a battery according to an embodiment 1.

According to an aspect of the present invention, there is provided an energy storage device including: an electrode assembly; a current collector connected to the electrode assembly; a terminal plate to which a bus bar for connecting energy storage devices to each other is fixed; and a metal-made fastening member which fastens the terminal plate and the current collector to each other, wherein the fastening member includes: a body portion fixed to the current collector; a shaft portion extending from the body portion and passing through a through hole formed in the terminal plate; and a swaged portion formed on a distal end of the shaft portion, and fixing the terminal plate between the swaged portion and the body portion in a sandwiching manner, and one of the body portion and the terminal plate of the fastening member has a projecting portion which is brought into contact with the other of the body portion and the terminal plate, and the projecting portion is positioned between a fixed portion of the terminal plate fixed to the bus bar and the shaft portion of the fastening member.

With this configuration, it is possible to suppress the increase in a contact resistance between a terminal plate and a fastening member.

Firstly, a summary of an energy storage device of this embodiment is described. The energy storage device of this embodiment includes: an electrode assembly; a current collector connected to the electrode assembly; a terminal plate to which a bus bar for connecting energy storage devices to each other is fixed; and a metal-made fastening member which fastens the terminal plate and the current collector to each other. The fastening member includes: a body portion fixed to the current collector; a shaft portion extending from the body portion and passing through a through hole formed in the terminal plate; and a swaged portion formed on a distal end of the shaft portion, and fixing the terminal plate between the swaged portion and the body portion in a sandwiching manner, and one of the body portion and the terminal plate of the fastening member has a projecting portion which is brought into contact with the other of the body portion and the terminal plate, and the projecting portion is positioned between a fixed portion of the terminal plate fixed to the bus bar and the shaft portion of the fastening member.

According to the energy storage device of this embodiment, when an external force is applied to the terminal plate, a portion of the terminal plate disposed outside the projecting portion is deformed using the projecting portion as an initiation point so that it is possible to suppress a deformation amount of a portion of the terminal plate positioned inside the projecting portion and around the through hole. Accordingly, a contact state between an inner peripheral surface of the through hole and the shaft portion can be maintained and hence, it is possible to suppress the increase in a contact resistance between the terminal plate and the fastening member.

In the energy storage device, the projecting portion is a circular annular portion which surrounds the shaft portion of the fastening member. With such a configuration, the deformation of the terminal plate can be suppressed over the whole circumference of the through hole. Accordingly, a contact state between the inner peripheral surface of the through hole and the shaft portion can be maintained over the whole circumference of the through hole and hence, the increase in a contact resistance can be further suppressed.

In the energy storage device, the projecting portion may be a circular annular portion which has a non-continuous portion. With such a configuration, it is possible to suppress a relative rotation between the terminal plate and the rivet using the shaft portion as the center of rotation.

In the energy storage device, the projecting portion may be formed on one of the fastening member and the terminal plate which has higher Vickers hardness. With such a configuration, it is possible to prevent the projecting portion from collapsing at the time of fixing the terminal plate by swaging a distal end of the shaft portion.

In the energy storage device, the projecting portion may have a tapered shape where a cross-sectional area of the projecting portion on the distal end side is smaller than a cross-sectional area of the projecting portion on the proximal end side. With such a configuration, close contact between the projecting portion and the other of the fastening member and the terminal plate (the member on which the projecting portion is not formed) is increased and hence, it is possible to effectively suppress a deformation amount of the portion of the terminal plate disposed inside the projecting portion and around the through hole.

Embodiment 1

Hereinafter, a battery 10 of an energy storage device according to an embodiment 1 is described with reference to drawings.

1. Overall Structure of Battery 10

Figure 2:
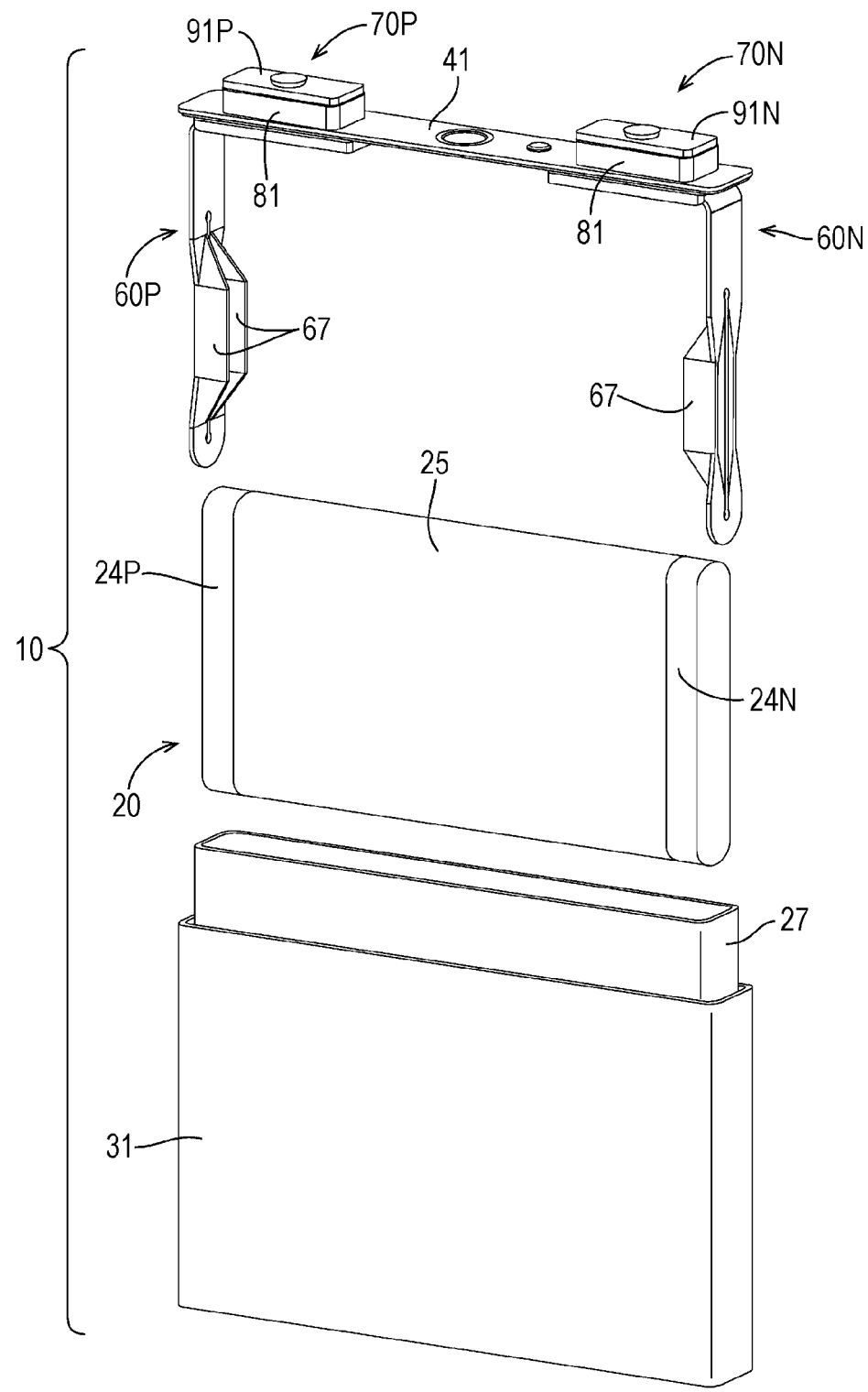
FIG. 2 is an exploded perspective view of the battery.

The battery 10 is a nonaqueous electrolyte secondary battery. To be more specific, the battery 10 is a lithium ion secondary battery. As shown in FIG. 1 and FIG. 2, the battery 10 includes: an electrode assembly 20; a case 30; a positive current collector 60P; a negative current collector 60N; a positive terminal portion 70P; and a negative terminal portion 70N. In the description made hereinafter, the direction along which the positive terminal portion 70P and the negative terminal portion 70N are arranged is assumed as the X direction, the height direction of the case 30 is assumed as the Y direction, and the depth direction of the case 30 is assumed as the Z direction.

The electrode assembly 20 includes: a positive electrode sheet 23P; a negative electrode sheet 23N; and a separator 25. In the positive electrode sheet 23P, a positive electrode active substance is carried on a surface of an aluminum foil. A positive current collector foil 24P where an aluminum foil or a copper foil is exposed is formed on one edge portion of the positive electrode sheet 23P. In the negative electrode sheet 23N, a negative electrode active substance is carried on a surface of a copper foil. A negative current collector foil 24N where a copper foil is exposed is formed on the other edge portion of the negative electrode sheet 23N.

As shown in FIG. 3, the electrode assembly 20 is formed by winding the positive electrode sheet 23P and the negative electrode sheet 23N into an elongated cylindrical shape with a separator 25 interposed between the positive electrode sheet 23P and the negative electrode sheet 23N such that the position of the positive electrode sheet 23P and the position of the negative electrode sheet 23N are displaced from each other in the different directions, that is, in the left and right directions respectively. The electrode assembly 20 is housed in the case 30 in a state where the whole electrode assembly 20 is covered by an insulating cover 27.

As shown in FIG. 1 and FIG. 2, the case 30 includes a case body 31 for housing the electrode assembly 20 therein, and a lid member 41. The case body 31 is a metal member made of an aluminum alloy, steel or the like. The case body 31 is a bottomed rectangular cylindrical body having long sides thereof extending in the X direction and short sides thereof extending in the Z direction. The case body 31 has four outer peripheral walls 32A to 32D and a bottom surface wall 35.

The lid member 41 is a metal member made of an aluminum alloy, steel or the like, and is also a rectangular plate-like member extending in the X direction. A size of the lid member 41 corresponds to a size of an opening portion of the case body 31. The lid member 41 is mounted on the opening portion of the case body 31, and seals the opening portion of the case body 31.

The lid member 41 has rivet insertion holes 42 at both sides thereof in the X direction. The lid member 41 also has a solution filling hole 45 and a pressure release valve 49 at a center portion thereof. The solution filling hole 45 is formed so as to enable filling of the case 30 with an electrolyte solution. The solution filling hole 45 is sealed by the solution filling plug 50 after filling of the electrolyte solution is finished.

Figure 4:
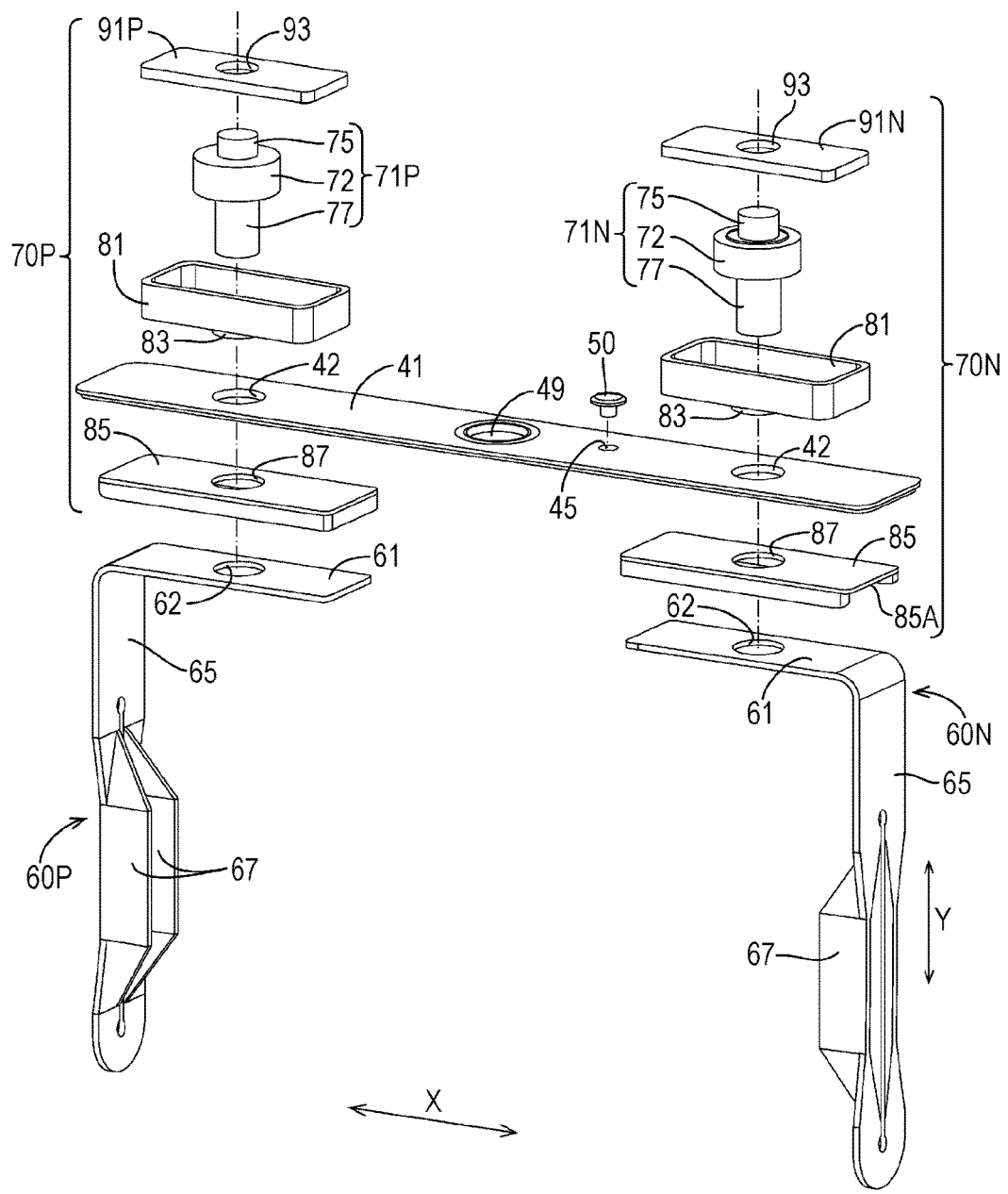
FIG. 4 is an exploded perspective view of a lid member, a positive terminal portion, a negative terminal portion, a positive current collector, and a negative current collector.
Figure 5:
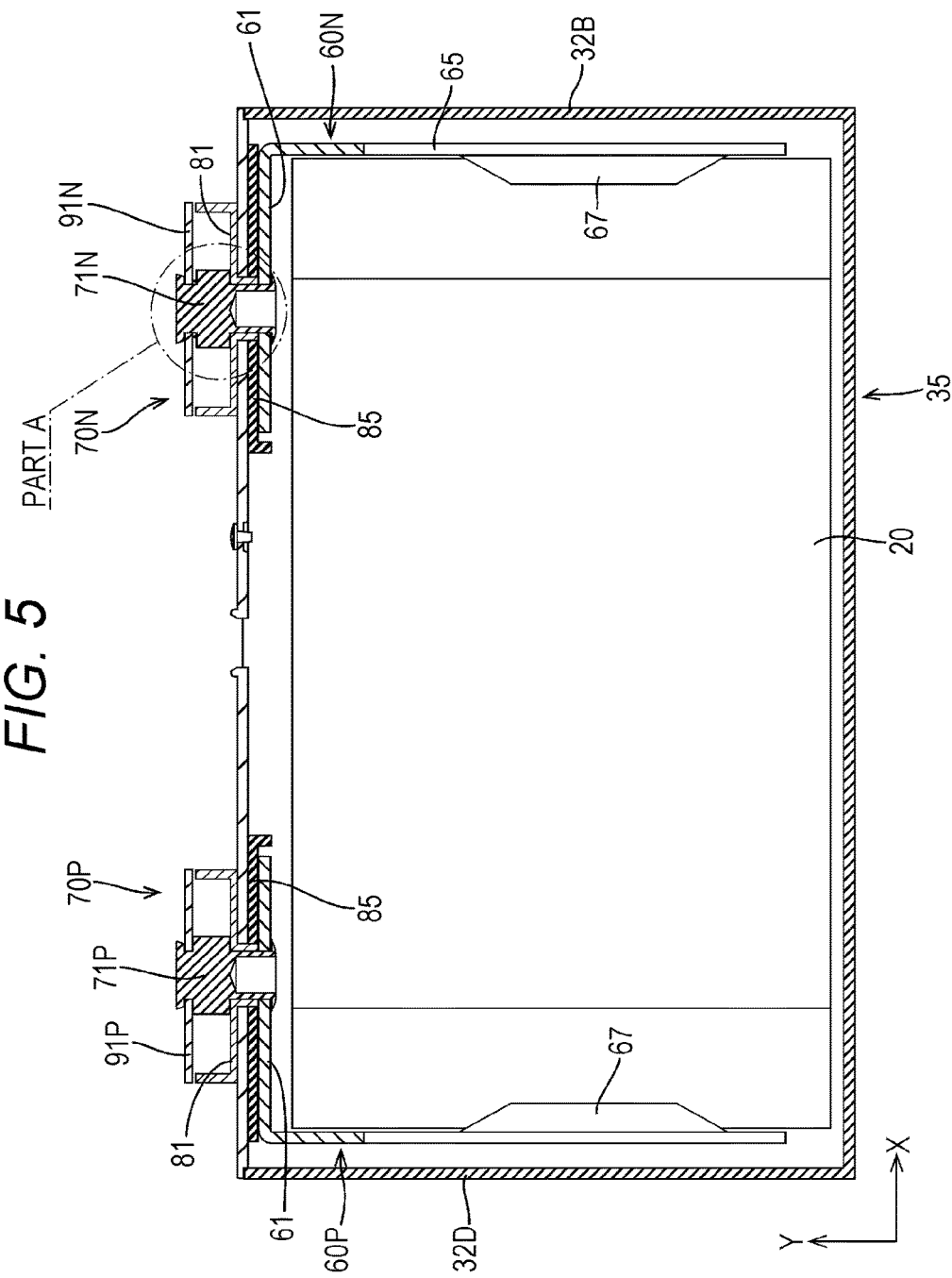
FIG. 5 is a vertical cross-sectional view of the battery.

As shown in FIG. 2 and FIG. 4, the positive current collector 60P and the negative current collector 60N are separately disposed on a lower surface of the lid member 41 on both sides in the X direction. In this embodiment, the positive current collector 60P is disposed on the left side in FIG. 2 and FIG. 4, and the negative current collector 60N is disposed on the right side in FIG. 2.

The positive current collector 60P and the negative current collector 60N are formed of a conductive metal member (to be more specific, the positive current collector 60P being made of aluminum, and the negative current collector 60N being made of copper). The positive current collector 60P and the negative current collector 60N respectively include: a first connecting portion 61 having a flat plate shape; and a second connecting portion 65 which is bent downward from a side end portion of the first connecting portion 61. The positive current collector 60P and the negative current collector 60N are respectively fixed to the lid member 41 in a state where the first connecting portion 61 faces the lower surface of the lid member 41 in an opposed manner and the second connecting portion 65 extends downward.

To describe specifically, second shaft portions 77 of rivets 71P, 71N pass through the through holes 62 formed in the first connecting portions 61 respectively. By fastening the second shaft portions 77 by swaging, the positive current collector 60P and the negative current collector 60N are fixed to the lower surface of the lid member 41 with resin plates 85 interposed therebetween.

A pair of opposedly-facing walls 67 is formed on the second connecting portion 65 of the positive current collector 60P and on the second connecting portion 65 of the negative current collector 60N respectively. The second connecting portion 65 of the positive current collector 60P and the second connecting portion 65 of the negative current collector 60N face each other in an opposed manner in the X direction with the electrode assembly 20 interposed therebetween. The pair of opposedly-facing walls 67 formed on the positive current collector 60P is sandwiched by sandwiching plates not shown in the drawing from the outside so that the opposedly-facing walls 67 are fixed to the positive current collector foil 24P formed on the side edge portion of the positive electrode sheet 23P. On the other hand, the pair of opposedly-facing walls 67 formed on the negative current collector 60N is sandwiched by sandwiching plates not shown in the drawing from the outside so that the opposedly-facing walls 67 are fixed to the negative current collector foil 24N formed on the side edge portion of the negative electrode sheet 23N.

As shown in FIG. 1 and FIG. 4, the positive terminal portion 70P and the negative terminal portion 70N are disposed separately from each other on an upper surface of the lid member 41 on both sides in the X direction. In this embodiment, the positive terminal portion 70P is arranged on the left side in FIG. 1, and the negative terminal portion 70N is arranged on the right side in FIG. 1.

As shown in FIG. 4, the positive terminal portion 70P includes: the rivet 71P made of metal (to be more specific, made of aluminum); a gasket 81; the resin plate 85; and a terminal plate 91P made of metal (to be more specific, made of aluminum). As shown in FIG. 4, the negative terminal portion 70N includes: the rivet 71N made of metal (to be more specific, made of copper); a gasket 81; the resin plate 85; and a terminal plate 91N made of metal (to be more specific, made of aluminum).

The terminal portion 70P on the positive electrode side and the terminal portion 70N on the negative electrode side have the substantially same structure. Hereinafter, the structures of both terminal portions are described by taking the structure of the negative terminal portion 70N as an example.

Figure 9:
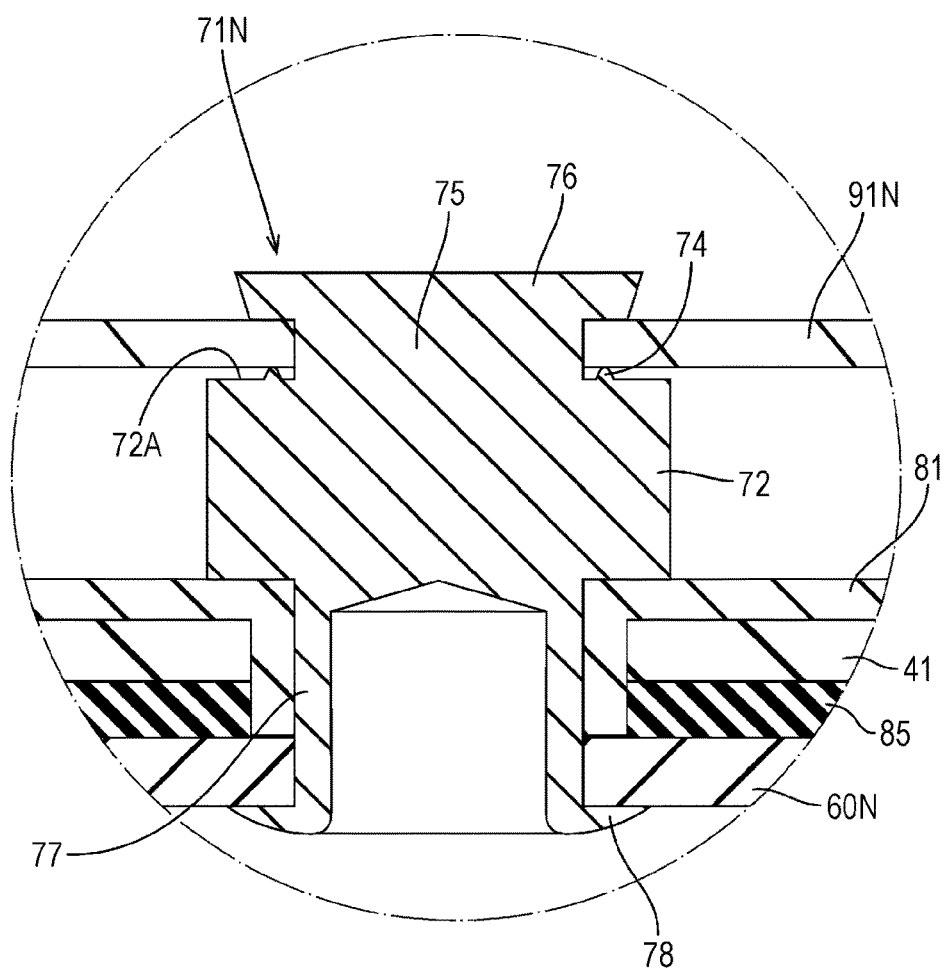
FIG. 9 is a view showing a part A in FIG. 5 in an enlarged manner.

The rivet 71N is a dual shaft type rivet, and includes: a body portion 72 having a circular columnar shape; a first shaft portion 75 which extends upward from an upper surface of the body portion 72; and a second shaft portion 77 which extends downward from a lower surface of the body portion 72. The second shaft portion 77 passes through a through hole formed in the gasket 81, the rivet insertion hole 42 formed in the lid member 41, a through hole 87 formed in the resin plate 85, and a through hole 62 formed in the negative current collector 60N in this order. As shown in FIG. 9, a second swaged portion 78 is formed on a distal end of the second shaft portion 77 so as to fix the negative current collector 60N to the lid member 41 with the resin plate 85 interposed between the negative current collector 60N and the lid member 41.

The gasket 81 is a synthetic resin member having insulating property. The gasket 81 has a box shape so as to house the body portion 72 of the rivet 71N therein. A through hole through which the first shaft portion 75 of the rivet 71N passes is formed in a bottom surface of the gasket 81, and an annular protrusion 83 is formed on the bottom surface of the gasket 81 around the through hole.

The gasket 81 is arranged on the upper surface side of the lid member 41 in a state where the annular protrusion 83 is fitted in the rivet insertion hole 42 thus insulating the lid member 41 and the rivet 71N from each other. A sealing material is filled in the gasket 81 thus sealing an area around the rivet insertion hole 42 and an area around the rivet 71N.

The resin plate 85 is a synthetic resin member having insulating property. The resin plate 85 has a rectangular shape extending in the X direction, and has the through hole 87 at a position corresponding to the rivet insertion hole 42 formed in the lid member 41. The resin plate 85 has a receiving portion 85A which can receive the first connecting portion 61 of the negative current collector 60N on a lower surface side thereof. The resin plate 85 is disposed on the lower surface side of the lid member 41, and insulates the lid member 41 and the negative current collector 60N from each other.

The terminal plate 91N is a flat plate extending in the X direction, and has a first through hole 93. The terminal plate 91N is disposed on the upper surface side of the lid member 41, and the first shaft portion 75 of the rivet 71N passes through the first through hole 93. As shown in FIG. 9, a first swaged portion 76 is formed on a distal end of the first shaft portion 75, and fixes the terminal plate 91N to the lid member 41 by means of the rivet 71N.

As described above, the terminal plate 91N on the negative electrode side is electrically connected to the negative electrode sheet 23N through the rivet 71N and the negative current collector 60N. The terminal plate 91P on the positive electrode side is electrically connected to the positive electrode sheet 23P through the rivet 71P and the positive current collector 60P. The rivet 71N fastens both the terminal plate 91N and the current collector 60N to the lid member 41, and the rivet 71P fastens both the terminal plate 91P and the current collector 60P to the lid member 41. The rivet 71N, 71P corresponds to "fastening member".

2. Contact Resistance Reducing Structure

Figure 6:
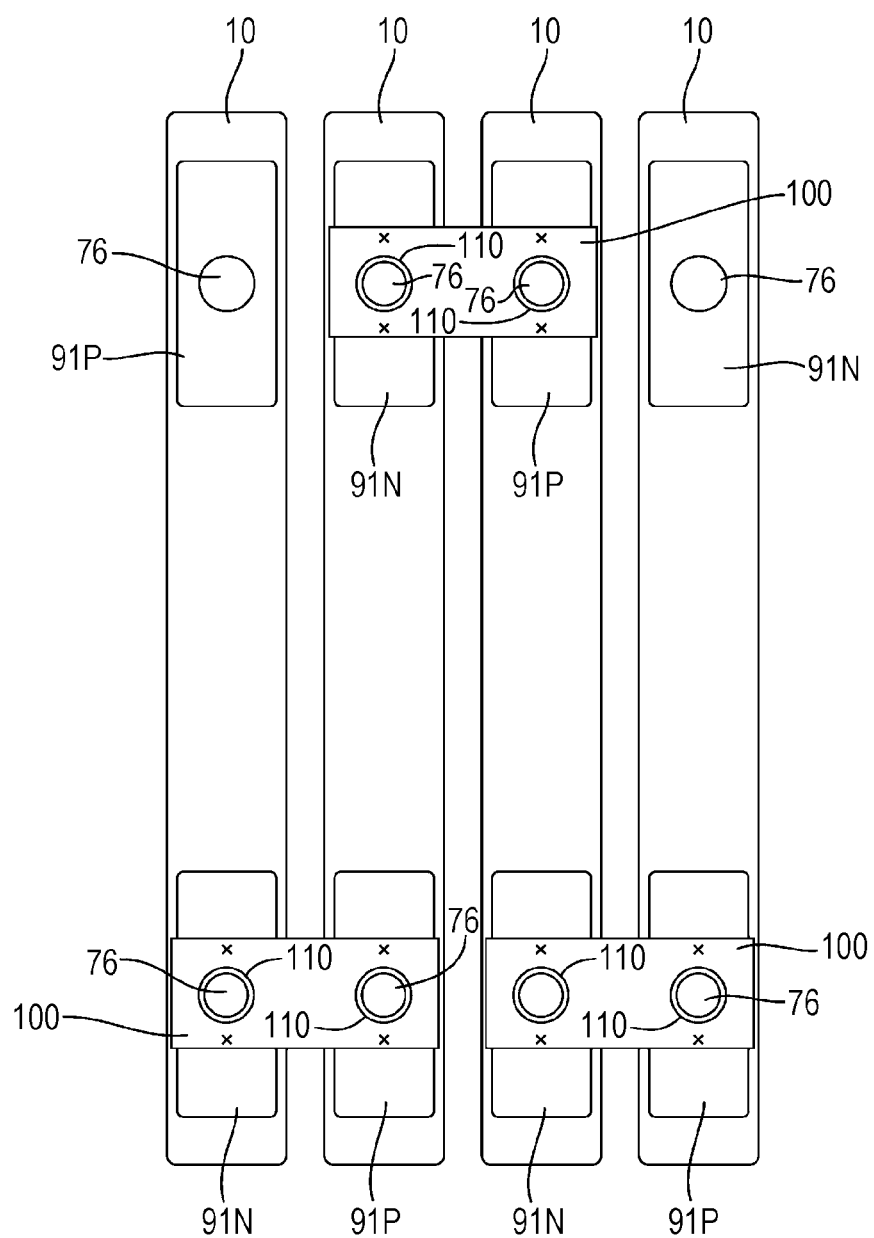
FIG. 6 is a plan view of batteries connected by bus bars.
Figure 7:
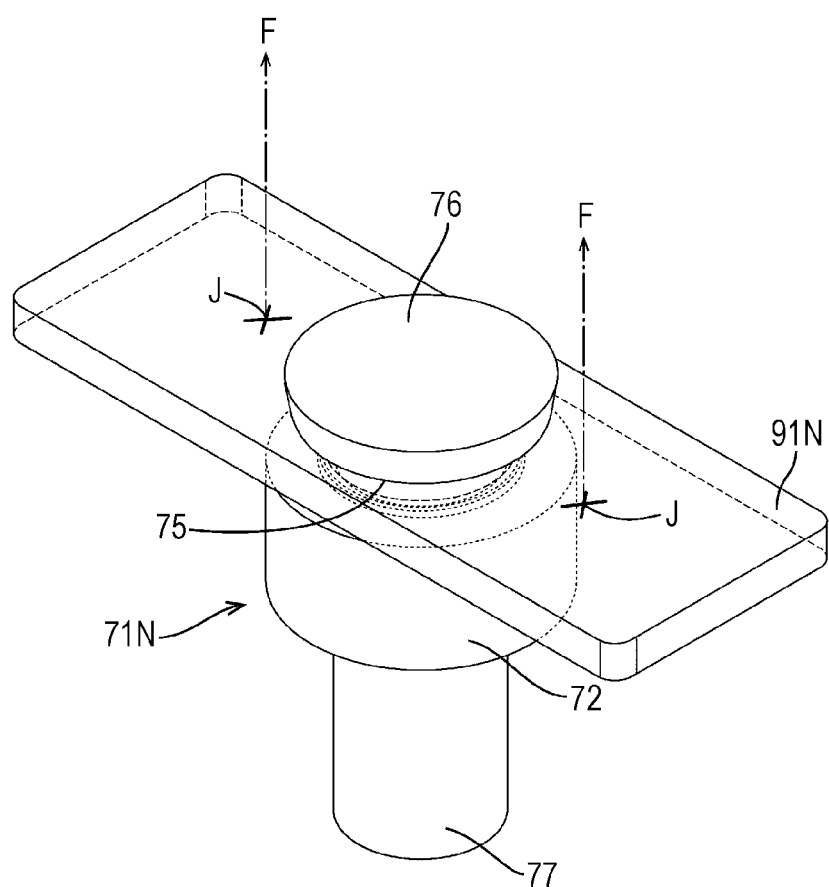
FIG. 7 is a perspective view of a rivet (showing the rivet in a state where a terminal plate is fixed by the rivet).
Figure 10:
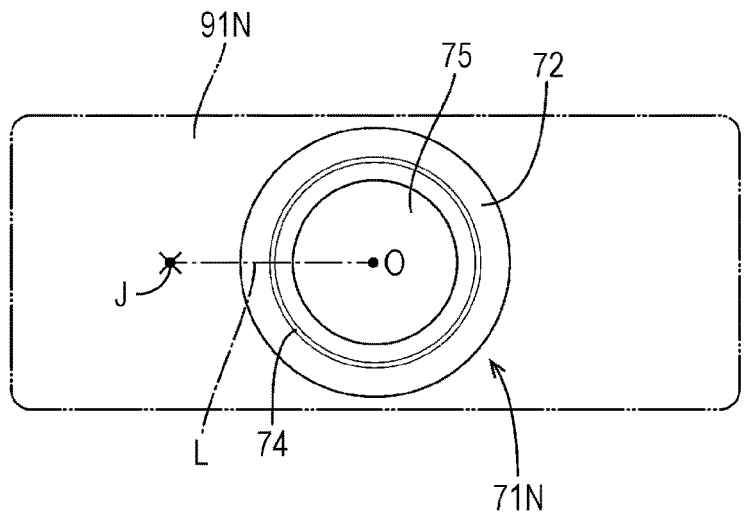
FIG. 10 is a plan view showing a positional relationship between a welded portion on the terminal plate, a projecting portion of the rivet, and a first shaft portion of the rivet.

As shown in FIG. 6, in connecting the batteries 10 to each other in series, bus bars 100 are used for such connection of the batteries 10. An energy storage apparatus (battery module) includes the batteries 10 and bus bars 100 connected to the terminal plates 91P of the batteries 10. The bus bar 100 is a metal plate having a flat plate shape, and has a release hole 110 on both ends thereof in the length direction of the bus bar 100. One end of the bus bar 100 is connected to the terminal plate 91P of the battery 10, and the other end of the bus bar 100 is connected to an external circuit. The external circuit may be, for example, the terminal plate 91N of another battery 10, a terminal of another battery module, or a control device such as a charging/discharging device. The bus bar 100 is arranged such that the release holes 110 are aligned with the first swaged portions 76 and the bus bar 100 straddles over terminal plates 91P, 91N of two batteries 10 to be connected to each other. The bus bar 100 is fixed to each terminal plate 91P, 91N by welding two portions of the bus bar 100 positioned on both sides of the first swaged portion 76 to the terminal plate 91P, 91N. In FIG. 6, FIG. 7 and FIG. 10, the welded portion (corresponding to "fixed portion") J of the bus bar 100 which is welded to the terminal plate 91N, 91P is indicated by symbol "x".

When the batteries 10 connected by the bus bars 100 as described above are mounted on a vehicle, due to vibrations generated during traveling, a force F in the vertical direction is applied to the terminal plates 91P, 91N of each battery 10 by way of the welded portions J of the bus bar 100 (see FIG. 7).

On the other hand, the first shaft portion 75 of the rivet 71P, 71N passes through the first through hole 93 formed in the terminal plate 91P, 91N, and the rivet 71P, 71N and the terminal plate 91P, 91N are brought into contact with each other by way of an outer peripheral surface of the first shaft portion 75 and an inner peripheral surface of the first through hole 93. Accordingly, when the terminal plate 91P, 91N is deformed due to a repeated application of the force F in the vertical direction, and such deformation reaches a portion of the terminal plate 91P, 91N around the first through hole 93, a contact area between the first shaft portion 75 and the terminal plate 91P, 91N is decreased so that a contact resistance between the first shaft portion 75 and the terminal plate 91P, 91N is increased.

Figure 8:
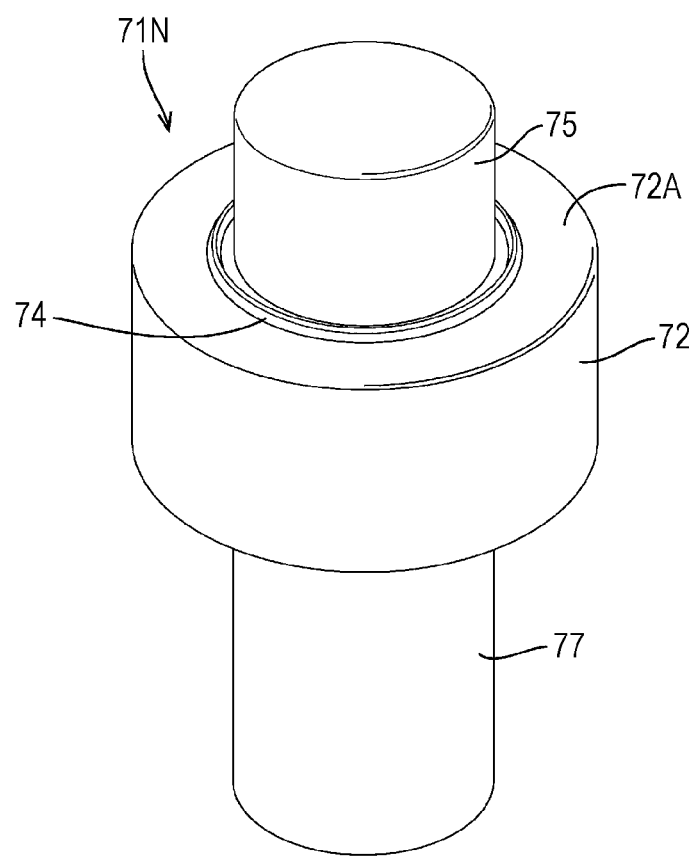
FIG. 8 is a perspective view of the rivet (showing the rivet in a state where the terminal plate is not yet fixed by the rivet).

To overcome such a problem, in the battery 10 of this embodiment, as shown in FIG. 8, a projecting portion 74 is formed on an upper surface 72A (a surface which opposedly faces the terminal plate 91N) of the body portion 72 of the rivet 71N on the negative electrode side. The projecting portion 74 is formed of a circular annular portion which surrounds the first shaft portion 75 of the rivet 71N, and has a gentle mountain-like cross section. That is, the projecting portion 74 has a tapered cross-sectional shape where a cross-sectional area of the projecting portion 74 on the distal end side is smaller than a cross-sectional area of the projecting portion 74 on a proximal end side. As shown in FIG. 9, the projecting portion 74 is positioned below the first swaged portion 76 so as to sandwich the terminal plate 91N between the projecting portion 74 and the first swaged portion 76 in the vertical direction. For the sake of convenience of description, in FIG. 9, the structure is shown where a gap is formed between the upper surface 72A of the body portion 72 of the rivet 71N on the negative electrode side and a lower surface of the terminal plate 91N. However, the projecting portion 74 bites into the lower surface of the terminal plate 91N in this embodiment, and hence, in an actual battery, no gap is formed between the upper surface 72A of the body portion 72 and the lower surface of the terminal plate 91N. When there is no difference between Vickers hardness of the projecting portion 74 and Vickers hardness of the terminal plate 91N, or when the difference between Vickers hardness of the projecting portion 74 and Vickers hardness of the terminal plate 91N is small, there may be a case where such a gap is formed. From a viewpoint of increasing a contact area between the rivet body portion 72 and the terminal plate 91N, it is preferable that no gap be formed between the projecting portion 74 and the terminal plate 91N.

As shown in FIG. 10, the projecting portion 74 having a circular annular shape intersects a straight line L which connects the welded portion J on the terminal plate 91N and the center O of the first shaft portion 75 so that a relationship is established where a portion of the projecting portion 74 is positioned between the welded portion J on the terminal plate 91N and the first shaft portion 75 of the rivet 71N. Although the terminal plate 91N of the actual battery has two welded portions J, only one welded portion J is illustrated in FIG. 10 to facilitate the understanding of the relationship between three members consisting of the welded portion J, the first shaft portion 75 and the projecting portion 74.

With such a configuration, when a force F in the vertical direction is applied to the terminal plate 91N by way of the welded portion J, the terminal plate 91N is deformed using the projecting portion 74 as an initiation point and hence, the deformation is concentrated on a portion of the terminal plate 91N disposed outside the projecting portion 74 so that the deformation of the terminal plate 91N at a position inside the projecting portion 74 (on a side close to the first through hole 93) can be suppressed. That is, by forming the projecting portion 74 on the rivet 71N, the deformation of a portion of the terminal plate 91N positioned around the first through hole 93 can be suppressed and hence, a contact state between the inner peripheral surface of the first through hole 93 and the first shaft portion 75 can be maintained. Accordingly, it is possible to suppress the increase in a contact resistance between the terminal plate 91N and the rivet 71N.

Figure 11:
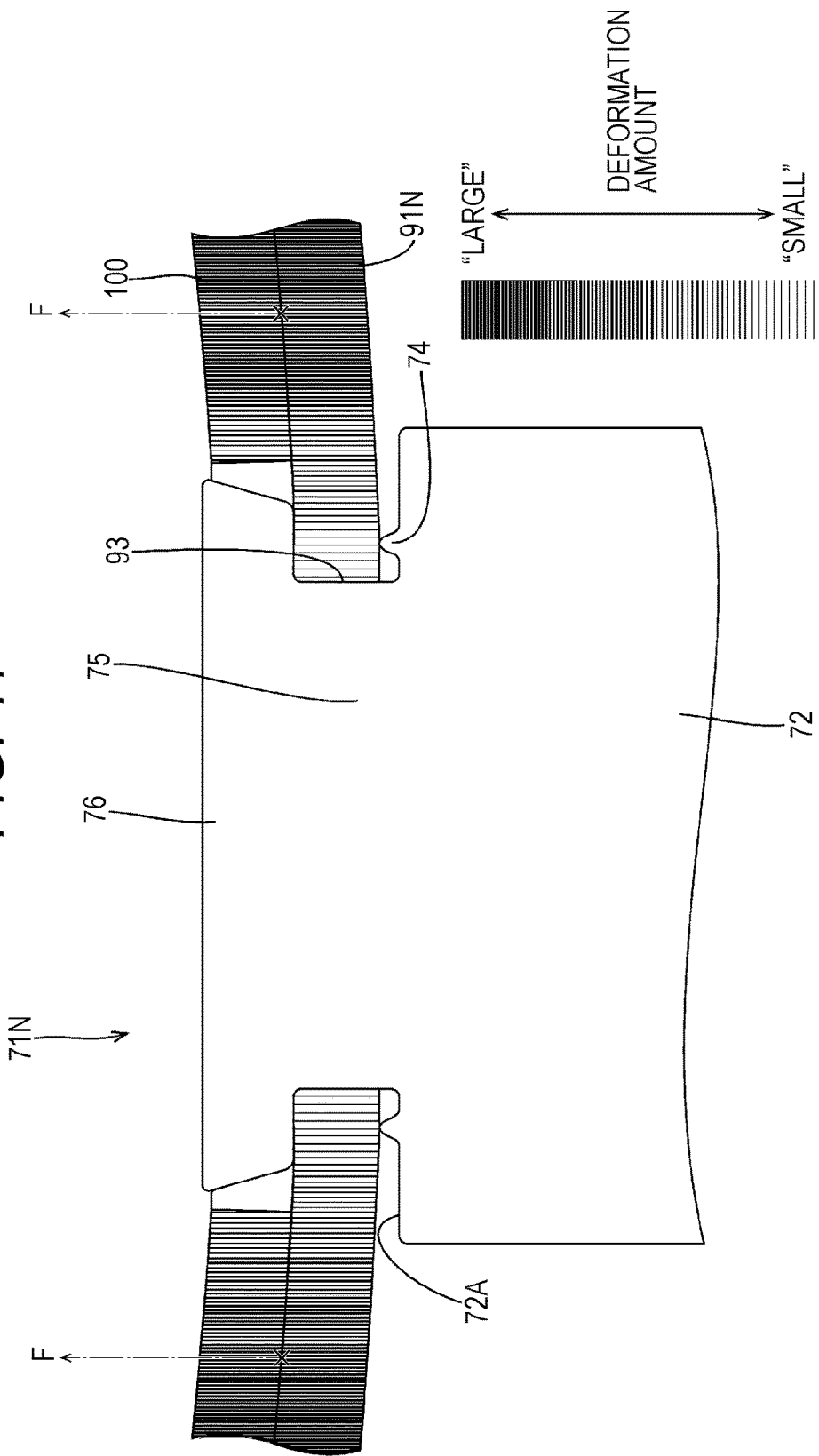
FIG. 11 is a cross-sectional view showing a simulation result relating to a deformation amount of the terminal plate (in the case where the projecting portion is formed).
Figure 12:
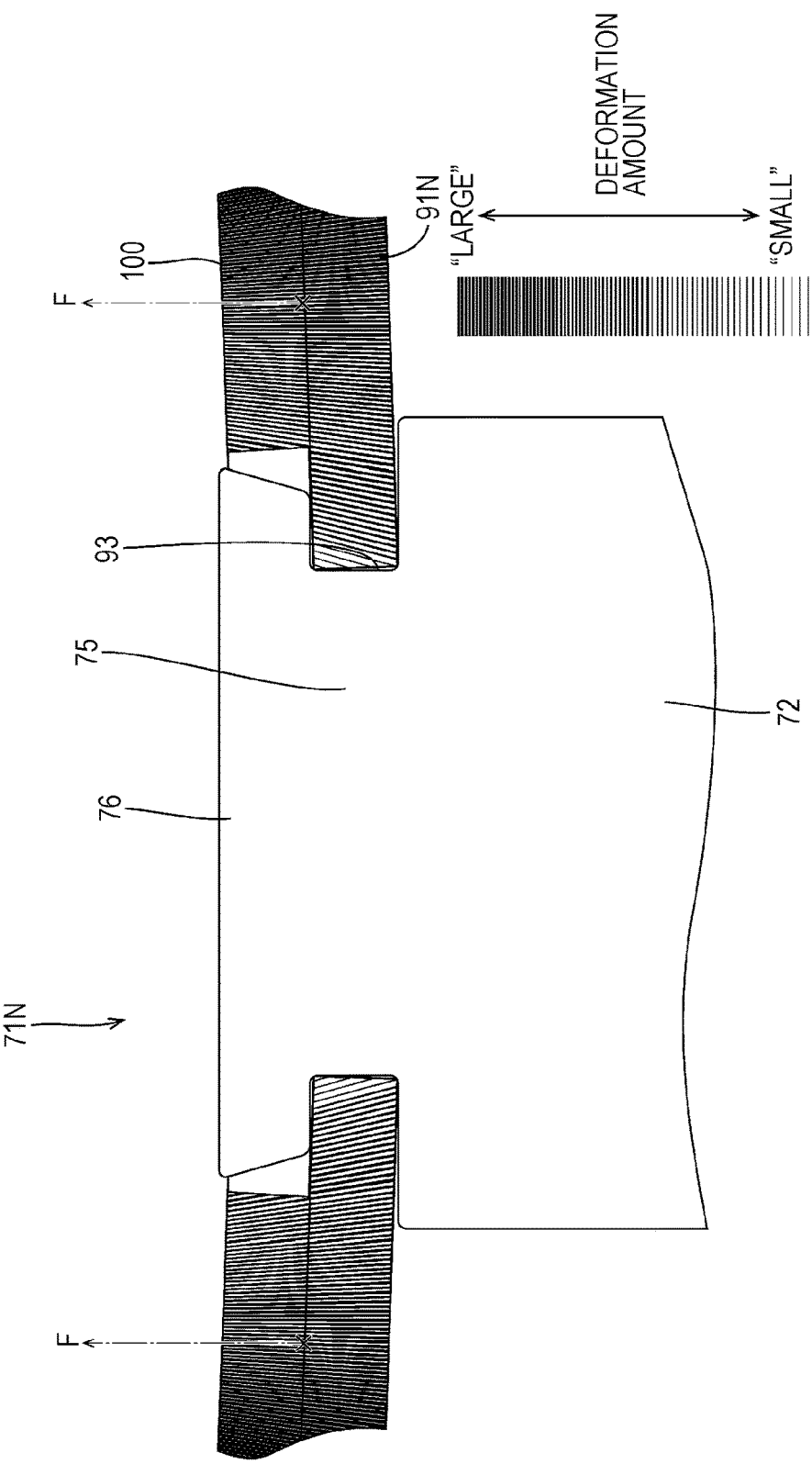
FIG. 12 is a cross-sectional view showing a simulation result relating to a deformation amount of the terminal plate (in the case where a projecting portion is not formed).

FIG. 11 and FIG. 12 show a result of simulation which is performed so as to investigate how the terminal plate 91N is deformed when a force F in the vertical direction is applied to the welded portion J. As shown in FIG. 11, in the case where the projecting portion 74 is formed, although a portion of the terminal plate 91N positioned outside the projecting portion 74 is largely deformed, a deformation amount of a portion of the terminal plate 91N positioned inside the projecting portion 74 (on a side close to the center of the rivet 71N) is small. Further, even after the deformation of the terminal plate 91N is completed, a state where the whole inner surface of the first through hole 93 formed in the terminal plate 91N is brought into close contact with the first shaft portion 75 is maintained so that a contact area between the inner peripheral surface of the first through hole 93 and the first shaft portion 75 is minimally decreased from a state before the terminal plate 91N is deformed. In the same manner as FIG. 9, also in FIG. 11, for the sake of convenience of description, the structure is shown where a gap is formed between the upper surface 72A of the body portion 72 of the rivet 71N on the negative electrode side and the lower surface of the terminal plate 91N. In this embodiment, however, in an actual battery, no gap is formed between the upper surface 72A of the body portion 72 and the lower surface of the terminal plate 91N.

On the other hand, as shown in FIG. 12, in the case where the projecting portion 74 is not formed on the rivet 71N, a deformation amount of a portion of the terminal plate 91N positioned inside the projecting portion 74 is also large in the same manner as a portion of the terminal plate 91N positioned outside the projecting portion 74. Further, a portion of the inner peripheral surface of the first through hole 93 is separated from the first shaft portion 75 so that a contact area between the inner peripheral surface of the first through hole 93 and the first shaft portion 75 is decreased from a state before the terminal plate 91N is deformed. Accordingly, also from this result of the simulation, it is confirmed that the projecting portion 74 can effectively suppress the increase in a contact resistance.

Although it is sufficient to form the projecting portion 74 on either one of the rivet 71 and the terminal plate 91, it is preferable to form the projecting portion 74 on either one of the rivet 71 and the terminal plate 91 which has higher Vickers hardness. The reason is that when the projecting portion 74 is formed on either one of the rivet 71 and the terminal plate 91 which has higher Vickers hardness, the projecting portion 74 minimally collapses at the time of fixing the terminal plate 91 to the rivet 71 by swaging. In the battery 10 of this embodiment, as described previously, the rivet 71N on the negative electrode side is made of copper and nickel plating is applied to the rivet 71N, while the terminal plate 91N on the negative electrode side is made of aluminum. Accordingly, Vickers hardness of the rivet 71N is higher than Vickers hardness of the terminal plate 91N and hence, the projecting portion 74 is formed on the rivet 71N. Vickers hardness is measured in accordance with JIS Z 2244: 2009.

As shown in FIG. 4, the battery 10 of this embodiment adopts the structure where the projecting portion 74 is formed only on the rivet 71N on the negative electrode side, and the projecting portion 74 is not formed on the rivet 71P on the positive electrode side.

3. Description of Advantageous Effect

According to the battery 10, it is possible to suppress the deformation of a portion of the terminal plate 91N positioned around the first through hole 93 and hence, a contact state between the terminal plate 91N and the rivet 71N can be maintained. Accordingly, it is possible to suppress the increase in a contact resistance between the terminal plate 91N and the rivet 71N.

Further, according to the battery 10, the projecting portion 74 is a circular annular portion and hence, the deformation of the terminal plate 91N can be suppressed over the whole circumference of the first through hole 93. Accordingly, a contact state between the inner peripheral surface of the first through hole 93 formed in the terminal plate 91N and the first shaft portion 75 of the rivet 71N can be maintained over the whole circumference of the first through hole 93 and hence, the increase in a contact resistance can be further suppressed.

Embodiment 2

Next, an embodiment 2 is described with reference to FIG. 13 and FIG. 14.

In the embodiment 1, the battery 10 having the structure where the bus bar 100 is welded to the terminal plates 91N, 91P is described as an example. A battery 200 in the embodiment 2 differs from the battery 10 in the embodiment 1 with respect to the fixing structure of a bus bar. That is, the battery 200 of the embodiment 2 adopts the fixing structure which uses terminal bolts 250N, 250P for fixing the bus bar. In the description made hereinafter, parts which are substantially equal to the part of the battery 10 of the embodiment 1 are given the same symbols, and the description of such parts is omitted.

Figure 13:
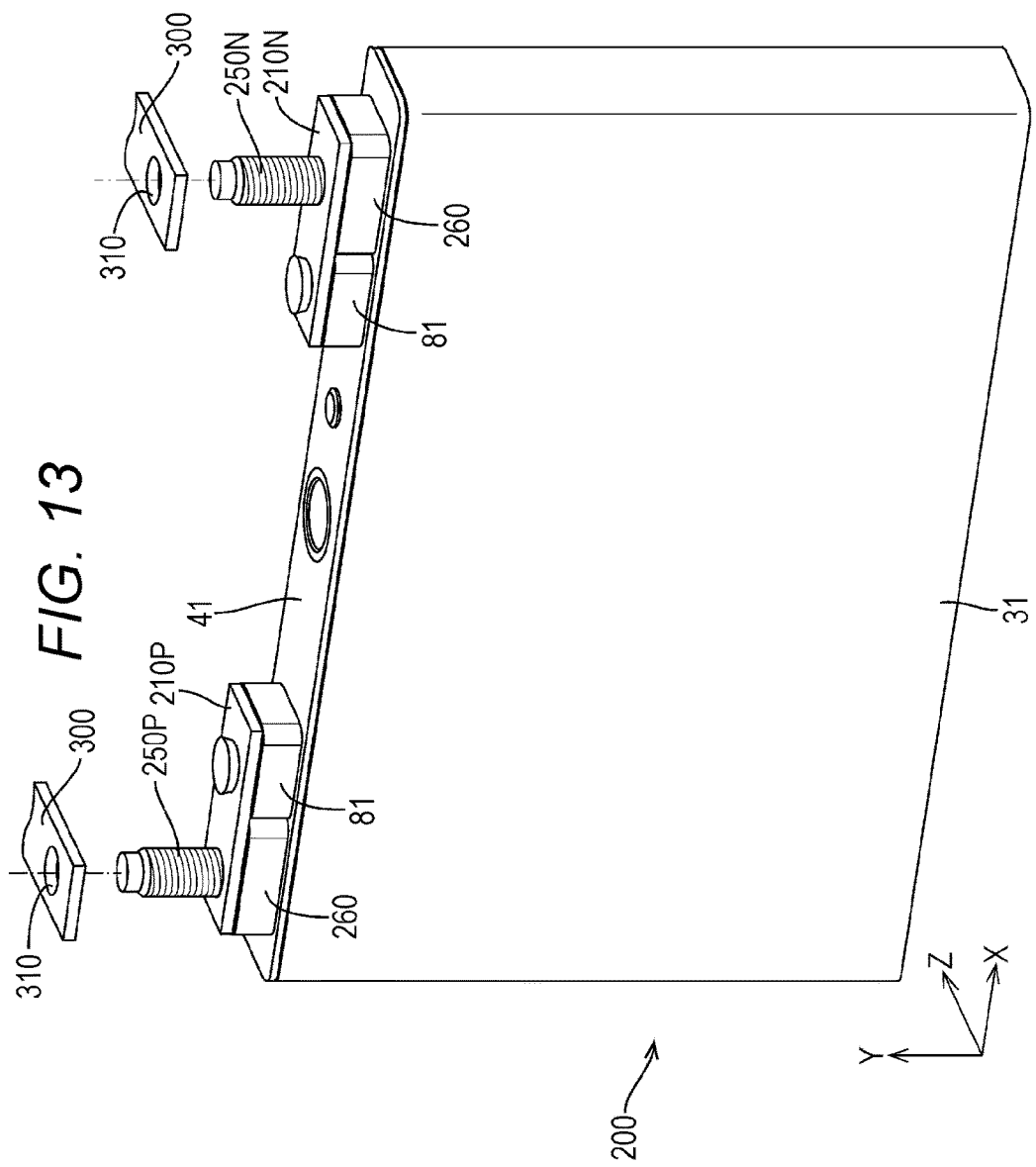
FIG. 13 is a perspective view of a battery according to an embodiment 2.
Figure 14:
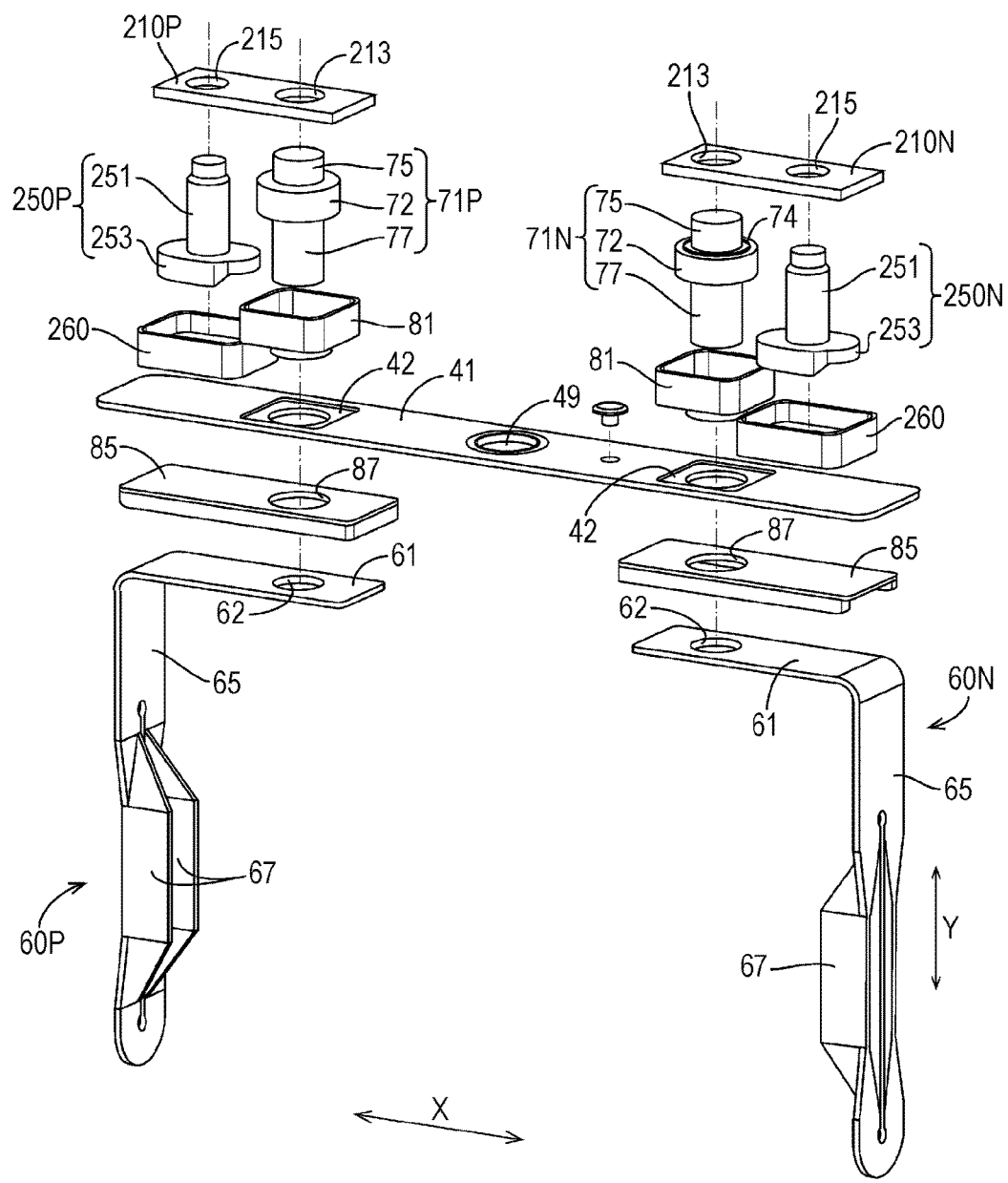
FIG. 14 is an exploded perspective view of a lid member, a positive terminal portion, a negative terminal portion, a positive current collector, and a negative current collector.

As shown in FIG. 13 and FIG. 14, terminal plates 210P, 210N have a flat plate shape, and each terminal plate 210P, 210N has a first through hole 213 and a second through hole 215. A first shaft portion 75 of the rivet 71P, 71N passes through the first through hole 213 formed in the terminal plate 210P, 210N, and a bolt shaft 251 of the terminal bolt 250P, 250N passes through the second through hole 215 formed in the terminal plate 210P, 210N. The terminal bolt 250P, 250N and the rivet 71P, 71N are arranged in a row on an upper surface of the lid member 41 in a state where a head portion 253 is housed in a bolt case 260.

A bus bar 300 has a bolt insertion hole 310 at a position corresponding to the bolt shaft 251 of the terminal bolt 250P, 250N. Accordingly, by making the terminal bolt 250P, 250N pass through the bolt insertion hole 310 and by making a nut threadedly engage with the terminal bolt 250P, 250N, the bus bars 300 can be fixed to the terminal plate 210P, 210N.

In the same manner as the battery 10, in the battery 200, a projecting portion 74 is formed on the rivet 71N. With such a configuration, the deformation of a portion of the terminal plate 210N positioned around the first through hole 213 can be suppressed and hence, it is possible to maintain a contact state between the terminal plate 210N and the rivet 71N. Accordingly, the increase in a contact resistance between the terminal plate 210N and the rivet 71N can be suppressed.

Another Embodiment

The present invention is not limited to the embodiments described with reference to the above-mentioned description and drawings and, for example, following embodiments also fall within the technical scope of the present invention.

(1) In the embodiments 1, 2, a lithium ion secondary battery is described as one example of the energy storage device. However, the present invention is applicable to any energy storage device provided that the energy storage device includes a current collector, a terminal plate and a metal fastening member (rivet) for fastening the current collector and the terminal plate to each other. The present invention is also applicable to a battery other than a lithium ion secondary battery or a capacitor such as an electric double-layer capacitor.

(2) In the embodiments 1, 2, the example where the projecting portion 74 is formed only on the rivet 71N on the negative electrode side is shown. However, it may be possible to adopt the structure where the projecting portion 74 is formed both on the rivet 71N on the negative electrode side and on the rivet 71P on the positive electrode side.

(3) In the embodiments 1, 2, the example where the projecting portion 74 is formed on the rivet 71N is shown. However, it may be possible to adopt the structure where the projecting portion 74 is formed on the terminal plate 91N.

Figure 15:
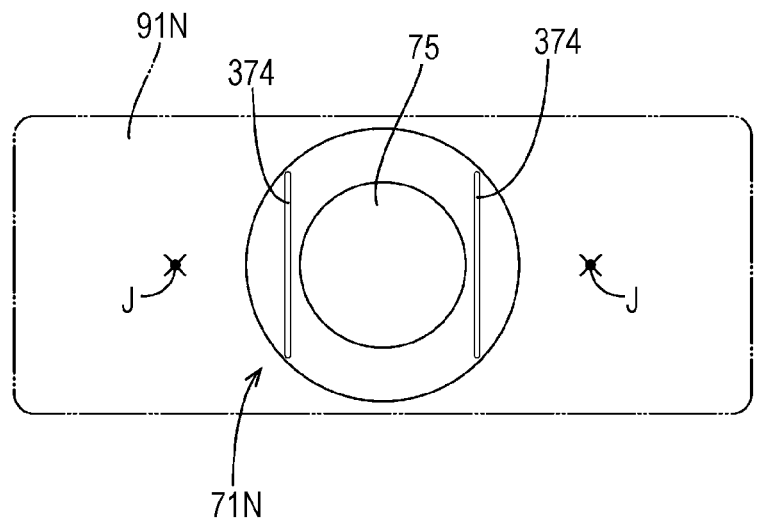
FIG. 15 is a plan view of a rivet (showing another configuration of the projecting portion).

(4) In the embodiments 1, 2, the projecting portion 74 is formed of a circular annular portion which surrounds the first shaft portion 75. However, it is sufficient that the projecting portion is positioned between the welded portion J on the terminal plate 91N and the first shaft portion 75 of the rivet 71N. For example, as shown in FIG. 15, a projecting portion 374 having a straight line shape may be adopted.

Figure 16:
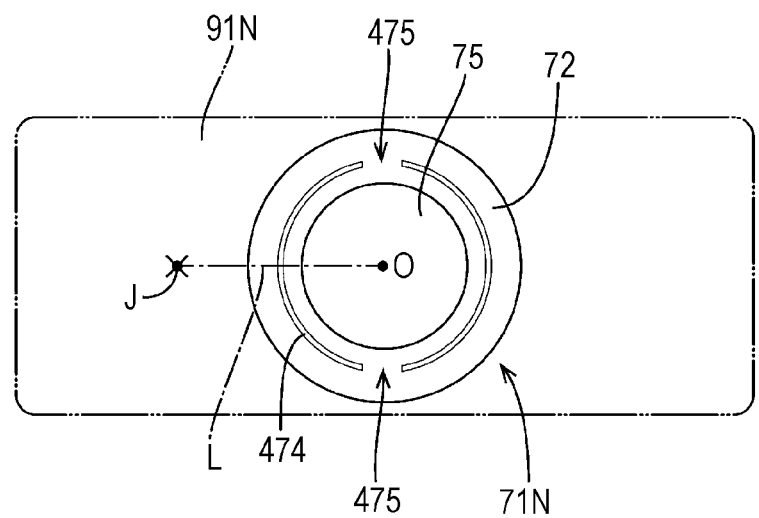
FIG. 16 is a plan view of a rivet (showing another configuration of the projecting portion).

(5) In the embodiments 1, 2, the example where the projecting portion 74 is formed of a circular annular portion which surrounds the first shaft portion 75 is described. However, as shown in FIG. 16, for example, the projecting portion may be formed of a circular annular projecting portion 474 where non-continuous portions 475 are partially formed in an annular portion. By forming the projecting portion 474 into a non-continuous circular annular shape, it is possible to suppress a relative rotation between the terminal plate 91N and the rivet 71N using the center O of the first shaft portion 75 as the center of rotation. In this case, as shown in FIG. 16, it is preferable that the projecting portion 474 be continuously formed in a portion of the rivet 71N positioned between the welded portion J on the terminal plate 91N and the first shaft portion 75 of the rivet 71N. By continuously forming the projecting portion 474 in the portion of the rivet 71N positioned between the welded portion J on the terminal plate 91N and the first shaft portion 75 of the rivet 71N, it is possible to suppress the transmission of a force applied to the welded portion J to a portion of the rivet 71N positioned inside the projecting portion 474 (on a side close to the first through hole 93).

(6) In the embodiments 1, 2, the example where the projecting portion 74 is formed of a circular annular portion which surrounds the first shaft portion 75 is described. However, the projecting portion may be formed into an elliptical circular annular portion, for example. By forming the projecting portion into the elliptical circular annular portion, it is possible to suppress a relative rotation between the terminal plate 91N and the rivet 71N using the center O of the first shaft portion 75 as the center of rotation.

Figure 17:
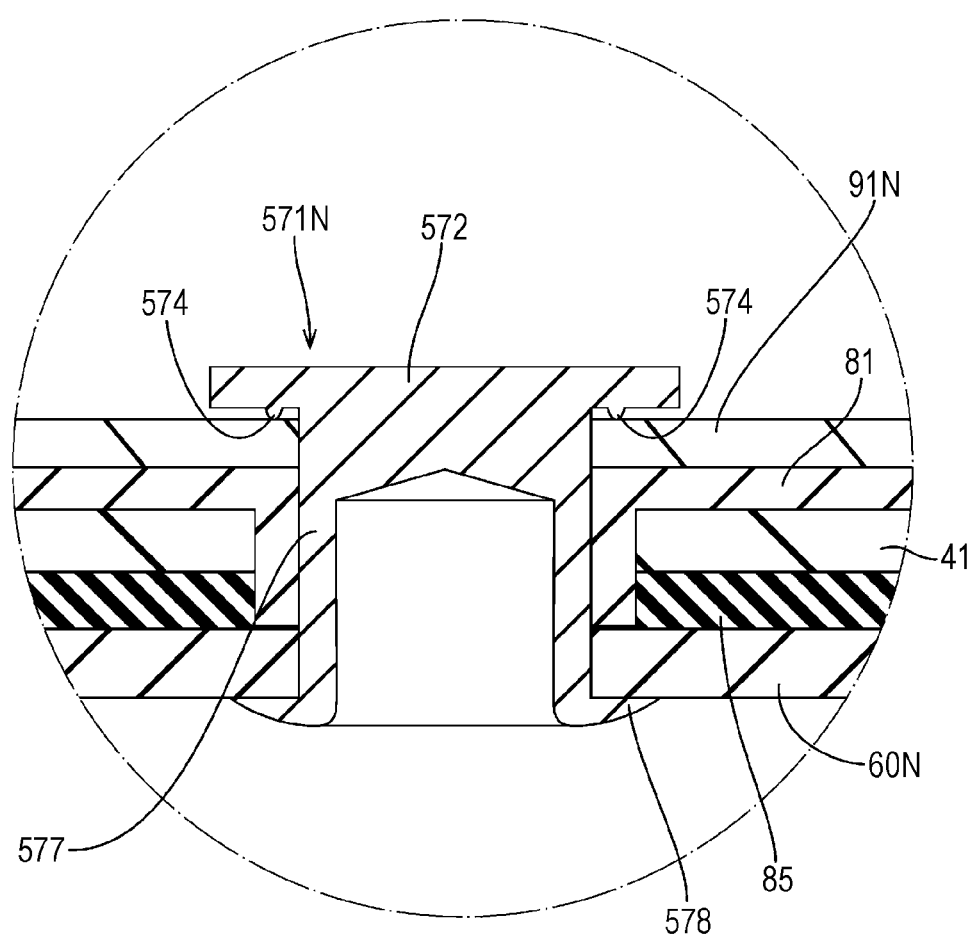
FIG. 17 is a cross-sectional view of a terminal portion (showing another configuration of a fastening structure by the rivet).

(7) In the embodiments 1, 2, the example is described where the rivet 71N includes: the first shaft portion 75 which extends upwardly from the upper surface of the body portion 72; and the second shaft portion 77 which extends downward from the lower surface of the body portion 72. However, the rivet 71N may not include either one of the shaft portions 75, 77. For example, as shown in FIG. 17, the rivet 571N may be formed of a body portion 572 and a shaft portion 577 which extends downwardly (not including a shaft portion which extends upwardly), and the terminal plate 91N and the current collector 60N may be fixed between the body portion 572 and a swaged portion 578 in a sandwiching manner. In this case, it is preferable that the projecting portion 574 be formed on either one of the rivet 571N and the terminal plate 91N which has higher Vickers hardness. In this modification, the rivet 571N is made of copper and the terminal plate 91N is made of aluminum and hence, it is preferable that the projecting portion 574 be formed on the rivet 571N.

What is claimed is:

1. An energy storage apparatus, comprising:
   energy storage devices each of which including:
      an electrode assembly;
      a current collector connected to the electrode assembly;
      a terminal plate including a through hole; and
      a metal-made fastening member which fastens the terminal plate and the current collector to each other; and
   a bus bar physically connected to the terminal plate at a contacting surface of the bus bar and the terminal plate,
   wherein the metal-made fastening member includes:
      a body portion attached to the current collector;
      a shaft portion extending from the body portion and passing through the through hole in a first direction; and
      a swaged portion formed on the shaft portion outside the energy storage devices and fixing the terminal plate between the swaged portion and the body portion in a sandwiching manner, and
   wherein one of the body portion and the terminal plate includes a projecting portion which is brought into a physical contact with an other of the body portion and the terminal plate, and the projecting portion is positioned between the contacting surface and the shaft portion of the metal-made fastening member as viewed in the first direction, wherein said each of the energy storage devices includes a lithium ion secondary battery.

2. The energy storage apparatus according to claim 1, wherein the projecting portion includes a circular annular portion which surrounds the shaft portion of the metal-made fastening member.

3. The energy storage apparatus according to claim 2, wherein the projecting portion includes a circular annular portion which includes a non-continuous portion.

4. The energy storage apparatus according to claim 1, wherein the projecting portion is formed on one of the metal-made fastening member and the terminal plate which has a higher Vickers hardness.

5. The energy storage apparatus according to claim 1, wherein the projecting portion has a tapered shape where a cross-sectional area of the projecting portion on a distal end side is smaller than a cross-sectional area of the projecting portion on a proximal end side.

6. The energy storage apparatus according to claim 1, wherein a first end of the bus bar is connected to the terminal plate and a second end of the bus bar is connected to an external circuit.

7. The energy storage apparatus according to claim 1, wherein the projecting portion reduces deformation of the terminal plate.

8. The energy storage apparatus according to claim 1, wherein the projecting portion abuts the body portion and the terminal plate.

9. The energy storage apparatus according to claim 1, wherein the projecting portion is in a direct contact with a bottom surface of the terminal plate.

10. The energy storage apparatus according to claim 1, wherein the terminal plate abuts the shaft portion in a second direction perpendicular to the first direction, such that a gap extends on a side of the projecting portion between an upper surface of the body portion and a lower surface of the terminal plate.

11. An energy storage device, comprising:
   an electrode assembly;
   a current collector connected to the electrode assembly;
   a terminal plate including a through hole, a bus bar for connecting the energy storage device to another energy storage device physically connects to the terminal plate at a contacting surface of the bus bar and the terminal plate; and
   a metal-made fastening member which fastens the terminal plate and the current collector to each other,
   wherein the metal-made fastening member includes:
      a body portion attached to the current collector;
      a shaft portion extending from the body portion and passing through the through hole in a first direction; and
      a swaged portion formed on the shaft portion outside the energy storage device and fixing the terminal plate between the swaged portion and the body portion in a sandwiching manner, and
   wherein one of the body portion and the terminal plate includes a projecting portion which is brought into a physical contact with an other of the body portion and the terminal plate, and the projecting portion is positioned between the contacting surface and the shaft portion of the metal-made fastening member as viewed in the first direction, wherein the energy storage device includes a lithium ion secondary battery.

12. The energy storage device according to claim 11, wherein the projecting portion includes a circular annular portion which surrounds the shaft portion of the metal-made fastening member.

13. The energy storage device according to claim 12, wherein the projecting portion includes a circular annular portion which has a non-continuous portion.

14. The energy storage device according to claim 11, wherein the projecting portion is formed on one of the metal-made fastening member and the terminal plate having a higher Vickers hardness.

15. The energy storage device according to claim 11, wherein the projecting portion has a tapered shape where a cross-sectional area of the projecting portion on a distal end side is smaller than a cross-sectional area of the projecting portion on a proximal end side.

16. The energy storage device according to claim 11, wherein the projecting portion reduces deformation of the terminal plate.

17. The energy storage device according to claim 11, wherein the projecting portion abuts the body portion and the terminal plate.

18. The energy storage device according to claim 11, wherein the terminal plate abuts the shaft portion in a second direction perpendicular to the first direction, such that a gap extends on a side of the projecting portion between an upper surface of the body portion and a lower surface of the terminal plate.

* * * * *